United States Patent [19]

Benoit-Guyod et al.

[11] 3,929,869
[45] Dec. 30, 1975

[54] PENTANOL DERIVATIVES

[75] Inventors: Martine Pierrette Benoit-Guyod; Jean-Louis Alain Benoit-Guyod, both of Grenoble; Andre Louis Boucherle, Corenc-Montfleury; Pierre Luc Eymard, Fontaine, all of France

[73] Assignee: Labaz, Paris, France

[22] Filed: Sept. 19, 1974

[21] Appl. No.: 507,380

Related U.S. Application Data

[63] Continuation of Ser. No. 374,530, June 28, 1973, abandoned.

[52] U.S. Cl. ......... 260/482 C; 260/463; 260/632 R; 260/638 B; 424/300; 424/343
[51] Int. Cl.² .................................... C07C 125/04
[58] Field of Search ......... 260/482 C, 632 R, 638 B

[56] References Cited
OTHER PUBLICATIONS

Tuot, M. et al., Bull. Soc. Chem. France, pp. 1087–1093 (1947).

*Primary Examiner*—Lorraine A. Weinberger
*Assistant Examiner*—Paul J. Killos
*Attorney, Agent, or Firm*—Mason, Kolehmainen, Rathburn & Wyss

[57] ABSTRACT

Pentanol derivatives of the general formula:

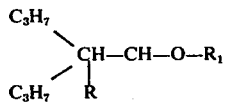

wherein R represents a straight-chain lower alkyl group containing from 1 to 4 carbon atoms and $R_1$ represents a hydrogen atom or the group $CONH_2$. They are useful as antidepressant and tranquillizing agents.

2 Claims, No Drawings

PENTANOL DERIVATIVES

This is a continuation of application Ser. No. 374,530 filed June 28, 1973 now abandoned.

This invention relates to novel pentanol derivatives having pharmacological activity, to a process for preparing them and to their use in the treatment of pathological conditions.

The pentanol derivatives with which the invention is concerned are represented by the general formula:

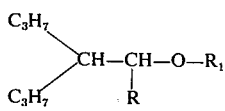

wherein R represents a straight-chain lower alkyl group containing from 1 to 4 carbon atoms and $R_1$ represents a hydrogen atom or the group $CONH_2$.

The invention is also concerned with pharmaceutical and veterinary compositions comprising as an essential active ingredient at least one of the compounds represented by formula I in association with a pharmaceutical carrier or excipient therefor.

The compounds of formula I in which $R_1$ represents a hydrogen atom may be prepared by treating in an organic medium such as an alcohol, for example ethanol, a ketone of the general formula:

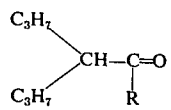

wherein R has the same meaning as in formula I, with a reducing agent such as, for example, sodium borohydride or hydrogen in the presence of a suitable catalyst such as, for example, Raney's nickel, to form the required alcohol of formula I. This reduction may be effected at ambient temperatures or by gentle heating of the reactants.

The compounds of formula I in which $R_1$ represents the group $CONH_2$ may be prepared by reacting the alcohol of formula I, obtained by the reduction process described above, with phosgene at room temperature and in an inert medium, for example toluene, to obtain the corresponding chloroformate which is condensed with ammonia to give the required compound of formula I.

The compounds of formula II are all known compounds having been disclosed, respectively as follows:
when R represents methyl or ethyl, in Bull. Soc. Chim. France, 49, 1875–1880 (1931),
when R represents n-propyl in Izv. Akad. Nauk. S.S.S.R., Otdel Khim. Nauk., 2, 178–183 (1949), and
when R represents n-butyl in Bull. Soc. Chim. France, 49, 1551–1555 (1931).

These compounds may be prepared, for example, by reacting 2-n-propylvaleronitrile with an approprite alkylmagnesium halide and hydrolysing the complex so formed, or by treating 2-n-propylvaleryl chloride with an appropriate alkylcadmium chloride.

The 2-propylpentanol derivatives of formula I (when $R_1$ is H) have been found to possess valuable pharmacological properties which render them useful in human and vertinary therapy. In particular it has been discovered that the compounds of the invention possess a wide range of psychotropic properties and, in particular, antidepressant and tranquillizing properties including anxiolytic, antiaggressive and anticonvulsant activities and, at higher doses, a mild sedative action. Moreover, the compounds of the invention possess practically no muscle-relaxant properties and are completely devoid of any cataleptic effects.

These pharmacological properties, taken as a whole, render the compounds of the invention useful in the treatment of mental disorders in which they can exert, according to the dose administered, a mild sedative effect or, on the other hand, a definite restorative action on the disturbed mental processes.

The restorative action will be obtained at weak doses which are not sedative and the mild sedative effect at higher doses.

It is known that a patient in a state of deep depression and who is being treated with antidepressants can manifest anxiety reactions when the depression begins to lift and when the patient becomes aware of his depressed condition.

This phenomenon is reported by RECH and MOORE in "An Introduction to Psychopharmacology" p. 337 (1971) where it is said:

"There are reports of attempts at suicide during the initial stages of treatment with antidepressant drugs . . . when the patient began to show objective signs of improvement. This paradoxical phenomenon during what appeared to be successful treatment has been explained as an increase in psychomotor drive to the extent that the patient is able to implement a suicidal wish, but still suffers from a significant degree of depressive effect".

With a view to preventing this anxious reaction when antidepressants are administered, the pratician has recourse to a tranquillizer of the anxiolytic type that he associates with the antidepressant employed.

Moreover, as anxiety is involved to a greater or lesser extent in all cases of depression, any agent that relieves the contributing tension will presumably afford some relief. For this reason, many therapeutic compositions associate both antidepressant and tranquillizing agents as most of the antidepressants used at present do not possess tranquillizing properties.

The essential value of the compounds of the invention lies in the fact that they present, in one and the same molecule of very slight toxicity, the twofold advantage of an antidepressant action combined with a tranquillizing effect of the anxiolytic type. This advantage enables the commonly found association of an antidepressant with a tranquillizer is one single medicament to be avoided. It also makes it possible to avoid the administration of an antidepressant and a tranquilizer as two separate medicaments.

The originality of the compounds of the invention lies in the fact that neither their antidepressant properties nor their tranquillizing properties operate with the same degree of intensity as that which characterizes the action of the antidepressants as such on the one hand and the tranquillizers as such on the other.

The compounds of the invention combine these two properties so that the tranquillizing effect which acts gently facilitates the antidepressant action of these compounds. This is because of the intervention of anxiety in the behaviour of the depressed patient as mentioned above. In this way, the patient is enabled to benefit to the maximum from the two properties which the compounds of the invention possess without being exposed to the risk of experiencing the undesirable side-effects which so often accompany the administration of antidepressants and tranquillizers as separate medicaments.

Amongst the antidepressants presenting a tranquillizing factor, certain tricyclic antidepressant agents may be cited. However, these compounds provoke to a certain degree side-effects of an anti-cholinergic nature such as dryness of the mouth, difficulties in optical accommodation, sweating and tachycardia. These undesirable side-effects can be avoided with the compounds of the invention at the doses employed to obtain an antidepressant effect combined with a tranquilizing action.

Moreover, in the treatment of epileptic patients with tricyclic antidepressants, it is generally necessary to increase the dose of anticonvulsant. This disadvantage can also be avoided with the compounds of the invention since the latter present, at tranquillizing and antidepressant doses, an anticonvulsant action of appreciable intensity.

The tranquillizing effect which has been observed with the compounds of the invention enables the latter to be generally classified in the category of the minor tranquillizers i.e. amongst the psychotropic compounds which possess an anticonvulsant, an anxiolytic and an antiaggressive action and are devoid of any cataleptic activity. Furthermore, these properties exert their effect at doses which always give a very favourable ratio with the neurotoxic dose 50 discussed below. The compounds of the invention may be compared with compounds of the benzodiazepine type but with this difference that the compounds of the invention have practically no muscle-relaxing properties which can in certain cases provoke fatigue and a tendency to stumble. Moreover, the tranquillizing action is already apparent at non-sedative doses which constitutes an advantage when no sedation is required.

Like pain, the various types of depression are numerous and constitute one of the most widespread disorders to which man is subject. For this reason, it is very difficult for the doctor to chooose amongst the various antidepressant drugs at his disposal, that which will be effective for the case under treatment. When faced with a case of depression, the psychiatrist is often obliged to feel his way by trying several antidepressant drugs one after the other until he discovers the most suitable medicament.

As regards this aspect of the question, the compounds of the invention will constitute valuable additions to the therapeutic arsenal at the disposal of the doctor and, if necessary, will provide useful replacement medication for a drug which has been ineffective for any reason such as, for example, a change in the state of the patient or habituation.

The compounds of the invention which were found to possess particularly useful antidepressant and tranquilizing properties were 4-n-propyl-3-heptanol carbamate and 4-n-propyl-3-heptanol hereinafter referred to as Compound A and Compound B respectively.

Pharmacological trials have been undertaken with a view to determining the toxicity of the compounds of the invention and the presence of the various properties which, taken together, are capable of rendering the said compounds useful as tranquilizers and antidepressants.

1. Acute Toxicity

The $LD_{50}$ was determined on the male mouse of the $OF_1$ strain by intraperitoneal route using the technique of KARBER and BEHRENS.

Under these conditions, the $LD_{50}$ of the preferred compounds as compared with the $LD_{50}$ of a tranquilizer i.e. diazepam under the same conditions were found to be as follows:

| Compound | $LD_{50}$ (in mg/kg) |
| --- | --- |
| A | 1400 |
| B | 1370 |
| Diazepam | 55 |

These results show that Compounds A and B are much less toxic than diazepam.

In the rat the $LD_{50}$ of Compound A by intraperitoneal route as compared with the $LD_{50}$ of an antidepressant i.e. imipramine under the same conditions was found to be as follows:

| Compound | $LD_{50}$ (in mg/kg) |
| --- | --- |
| A | 1100 |
| Imipramine | 100 |

These results shown that Compound A is much less toxic than imipramine.

2. Hypnotic Properties

The hypnotic properties of the compounds of the invention were demonstrated by studying posture reflex.

Male mice of the $OF_1$ strain, weighing about 22g, were divided into batches of 10. The animals of each batch were given an intraperitoneal dose of the compound to be studied so that each batch received a higher dose than the preceding batch.

The numbers of animals which lost the reflex at 6 to 10 minutes after administration were noted.

In this way, the $HD_{50}$ was determined i.e. the dose of the compound under study which caused 50% of the animals to lose the posture reflex at 6 to 10 minutes after administration.

The following results were obtained for the preferred compounds of the invention:

| Compound | $HD_{50}$ (in mg/kg) |
| --- | --- |
| A | 750 |
| B | about 800 |

3. Action on Behaviour a. Neurotoxicity

The test used was that known as the rotarod test described by BOISSIER (Therapie 1958, XIII, pp. 1074–1118). This test aimed at enabling the animals' ability to coordinate their movements to be evaluated.

It was carried out on batches of 10 mice each weighing about 22 g. The compound to be tested was administered by intraperitoneal route to the animals of each batch so that each batch received a higher dose than that given to the preceding batch.

Thirty minutes after administration, the mice were placed for two minutes on a wooden roller of 4.8 cm diameter turning at the rate of 4 revolutions per minute. The roller had a rough surface to prevent the animals from slipping.

By this means, the neurotoxic dose 50 ($NTD_{50}$) could be determined, i.e. the dose of the compound with which one half of the animals could not stay on the roller during the period of time fixed as the reference period.

The results obtained with the preferred compounds of the invention were as follows:

| Compound | $NTD_{50}$ (in mg/kg) |
|---|---|
| A | 330 |
| B | 500 |

The value of this test is twofold. Failure on the part of the animals gives a very early indication of the slightest damage to the neuromuscular functions which cannot be discerned by any other means. Secondly, this test serves as an element of comparison for drawing up index figures involving the results obtained with other behaviour tests.

b. Traction Test

This test which is as described by COURVOISIER in Psychotropic Drugs, Milan, 1957, pp 373-391, was undertaken with a view to determining the myorelaxant properties of the compounds of the invention by enabling sense of balance as well as muscular tonus and strength to be evaluated.

The test was carried out on groups of 10 male mice of the $OF_1$ strain weighing about 22g. It consisted in suspending the mice by the front paws to a horizontally stretched wire. Note was first taken of the time required by a group of control animals to effect recovery i.e. to place at least one of their back paws on the wire.

Each batch of animals was then given an intraperitoneal dose of the compound to be studied so that each batch received a higher dose than the preceding batch. Note was then taken of the number of animals which had lost the traction reflex 30 minutes after administration of the compound and the $ED_{50}$ was calculated i.e. the dose of the compound under study which caused loss of the reflex in 50% of the animals.

Under these conditions, the $ED_{50}$ for the preferred compounds of the invention were found to be as follows:

| Compound | $ED_{50}$ (in mg/kg) |
|---|---|
| A | 430 |
| B | 500 | c. Action on Spontaneous Motricity

The purpose of this test was to determine the dose of the compounds of the invention which were capable of increasing or decreasing motricity i.e. one of the behaviour factors of the animal in its usual environment.

Mice were divided into several identical batches comprising from 10 to 20 animals each. The equipment consisted of a double electromagnetic apparatus on one side of which was placed a cage containing the control group of animals while on the other side there was placed a cage containing the same number of mice previously treated by intraperitoneal route with a compound of the invention. The dose of the compound to be studied was calculated so that each batch of animals received a higher dose than the preceding batch.

As soon as the compound under study was administered all the movements of the animals were registered through the disturbances they caused in the magnetic field and then added up for each period of time.

In this way, the significant dose was determined, i.e. the dose of the compound under study which is required to diminish by at least 30% the motricity of the treated animals as compared to the controls. It was found that this significant dose was attained 30 minutes after administration of the compound under study.

The following results were registered with the preferred compounds of the invention:

| Compound | Significant Dose (mg/kg) |
|---|---|
| A | 50 |
| B | 70 |

4. Tranquillizing Properties a. Anxiolytic Action

The anxiolytic action was demonstrated by means of the four plates test of BOISSIER (European J. Pharmacol. 1968, 4, 145-151) and the "electrically-provoked combat" test.

Four plates test

Mice were divided into several indentical batches of 10 to 20 animals of which one batch was the control batch. The equipment used consisted of an apparatus on which were mounted four metal plates. These plates were connected alternatively to positive and negative sources of electric current so that, when the current was switched on, any animal passing over the plates received a shock through contact with two opposing electric poles. Each mouse was placed individually on the apparatus. Half the animals were allowed to explore the plates without any electric current and half with the current switched on. Each batch of animals except the controls was given a different dose of the compound to be tested by intraperitoneal route. No animal was used twice, each mouse being allowed to explore either the electrified plates or the non-electrified plates. The number of times each animal passed over the plates, either with or without current, was noted and compared to the number of times the untreated control animals passed over the non-electrified plates. It was observed that the untreated controls very quickly refused to explore the electrified plates out of fear of a shock, whereas the treated animals, under the influence of the anxiolytic action of the compound to be tested, were markedly less afraid.

These test made it possible to calculate the dose of compound required to achieve a significant increase in the number of electrified plates crossed without altering the number of non-electrical plates crossed.

Under these circumstances, it was found that the effective doses (ED) of the preferred compounds were as follows:

| Compound | ED (mg/kg) |
|---|---|
| A | 20 |
| B | 40 |

For comparison purposes, the same test was carried out with diazepam and Compound A using the ED of both compounds and the following results were registered:

TABLE 1

|  | Number of plates crossed in 1 min. | |
|---|---|---|
|  | Without current | With current |
| Controls | 14.7 ± 1.1 | 2.1 ± 0.4 |
| Compound A 20 mg/kg | 15.8 ± 1.4 | 5.6 ± 1 |
| Diazepam 1 mg/kg | 10.6 ± 1.3 | 9 ± 1.2 |

These figures show that diazepam is more active than Compound A. However, the results obtained without current indicate that Compound A is not depressant with respect to the normal motricity of the animals as is diazepam. Moreover, diazepam has no antidepressant properties.

A toxico-pharmacological index was also calculated by comparing the $LD_{50}$ with the ED registered in the above test.

This index is obtained by the following fraction:

$$\frac{D_{50}}{ED}$$

The index obtained for Compound A was 70 and that for diazepam was 55 which shows that Compound A is more advantageous than diazepam.

"Electrically-provoked combat" test

Under certain conditions a pair of mice reacts to an electric stimulus by a series of combats which are provoked by the anxiety felt by the animals as a result of the electric shock. This anxiety is expressed by a combat with the other animal which is rendered responsible. For this reason the following test can be considered as a means of evaluating the anxiolytic action of a compound.

Mice were divided into several batches each of 8 animals so as to form 4 pairs in each batch. The animals who had been previously on a diet consisting only of water were placed on a metal plate which was electrified by means of a stimulator which produced a series of electric impulses of an intensity varying between 40 and 80 volts according to the sensitivity of the animals. Each series of impulses lasted for a total of three minutes. During this period, note was taken of the total number of combats in which each pair of mice engaged.

The average number of combats could then be calculated for each batch by dividing the total number of combats by the number of pairs of mice.

The animals of each batch were then treated, by intraperitoneal route, with the compound to be studied which was administered in such a way that each batch received a higher dose than the preceding batch. Thirty minutes after administration, the animals were again exposed to the electric impulses and the decrease in the number of combats engaged in by the treated animals was registered as a percentage of the number of combats engaged in by the same animals before treatment.

In this way, it was possible to calculate the degree of protection against anxiety offered by each dose of the compound under study.

With the preferred compounds of the invention, the following results were noted:

| Compound | % of Protection | Dose (mg/kg) |
|---|---|---|
| A | 50 | 85 |
| B | 20 | 100 |

An activity index can also be calculated by comparing the $NDT_{50}$ with the $ED_{50}$ obtained in the above test i.e. the dose required to give 50% protection against anxiety to the treated animals as compared to the same animals before treatment.

This index is obtained by the following fraction:

$$\frac{NDT_{50}}{ED_{50}}$$

In the case of Compound A, this index is 3.8 which shows that there exists a considerable safety margin between the anxiolytic dose and the neurotoxic dose which affects the neuromuscular functions.

b. Antiaggressive Action

Aggressivity of Isolated Mice

If a male mouse is isolated in a cage for three to four weeks, it will spontaneously attack any other animal of the same species which is placed in the same cage. If the other animal has also been isolated under the same conditions a series of combats takes place.

Mice were isolated for the period of time required to render them spontaneously aggressive. Couples were then put together and note was taken of the number of combats which occurred over a period of three minutes. Each batch was composed of four pairs of mice.

The animals of each batch were then treated by intraperitoneal route with the compound to be studied which was administered in such a way that each batch received a higher dose than the preceding batch. Thirty minutes after administration, the couples were placed together again for a further three minutes and the number of combats noted. The $ED_{50}$ was then calculated i.e. the dose of the compound under study at which the number of combats engaged in by the treated animals was 50% less than the number of combats engaged in by the same animals before treatment.

The $ED_{50}$ registered for the preferred compounds of the invention were as follows:

| Compound | $ED_{50}$ (mg/kg) |
|---|---|
| A | 50 |
| B | 50 |

The activity index $$\frac{NDT_{50}}{ED_{50}}$$

for these two compounds was also calculated and was found to be:

| Compound | Activity Index |
|---|---|
| A | 6.5 |
| B | 10 |

These results show that there is a wide safety margin between the effective dose and the neurotoxic dose.

Aggressivity of Killer Rats

If, under certain conditions, male rats are kept alone in a cage for several weeks, they become spontaneously aggressive towards any mouse placed in the same cage and they kill it.

Mice were introduced one after another into cages containing an isolated rat and a selection was made of the rats which immediately killed three mice. In this way, batches of 6 to 8 rats were constituted. The rats were then given the compound to be studied by intraperitoneal route in such a way that each batch received a higher dose than the preceding batch. Thirty minutes after treatment, mice were placed in the cages.

The number of mice killed per batch of rats was noted and the $ED_{50}$ was calculated i.e. the dose of the compound under study at which the number of mice killed by the treated animals was 50% less than the number of mice killed by the same animals before treatment or, in other words, the dose which reduced the aggressivity of the rats by 50%.

Under these conditions, the $ED_{50}$ of the preferred compounds were found to be as follows:

| Compound | $ED_{50}$ (mg/kg) |
|---|---|
| A | 50 |
| B | 40 | c. Potentiation of Central Nervous System Depressants

Potentiation of Sodium Pentobarbital

An intraperitoneal dose of 100 mg/kg of the compound to be studied was administered to batches of 10 mice of the $OF_1$ strain weighing about 22g each. Thirty minutes later, an intraperitoneal dose of 30 mg/kg of sodium pentobarbital was given to the same animals. Note was taken of the average length of time that the animals took to fall asleep and of the average duration of the sleep. The combined action of the two substances thus administered was compared to that of 100 mg/kg of the same compound of the invention given alone under the same conditions and of 30 mg/kg of sodium pentobarbital also given alone under the same conditions.

The following results were obtained with the preferred compounds of the invention:

TABLE II

| Compound | Average time taken to fall sleep | Average duration of sleep |
|---|---|---|
| Compound A 100 mg/kg | No mice slept | No mice slept |
| Compound B 100 mg/kg | No mice slept | No mice slept |
| Sodium Pentobarbital 30 mg/kg | No mice slept | No mice slept |
| Compound A (100 mg/kg) + Sodium Pentobarbital (30 mg/kg) | 7 minutes (8 mice out of 10 slept) | 83 min. |
| Compound B (100 mg/kg) + Sodium Pentobarbital (30 mg/kg) | 9 minutes (5 mice out of 10 slept) | 46 min. |

5. Search for Possible Neuroleptic Properties

Under the experimental conditions employed, all the catalepsy tests (crossing of homolateral paws, four corks test, parallel bars test) carried out with the compounds of the invention gave negative results with doses up to just below the hypnotic doses.

6. Antidepressant Properties a. Antireserpine Action

The antidepressants antagonize or delay the sedative action of reserpine as measured by means of the ptosis and catatonia tests in the rat.

Ptosis

An intraperitoneal dose of 40 mg/kg of the compound to be studied was given to batches of 5 male rats of the $CF_1$ strain weighing an average of 300g. Thirty minutes later a dose of 3 mg/kg of reserpine was given by the same route. Ptosis was noted in relation to the length of time after administration of the reserpine and was evaluated for each eye in accordance with the following scale:

| | |
|---|---|
| 0 | eyelids open |
| 1 | eyelids ¼ closed |
| 2 | eyelids ½ closed |
| 3 | eyelids ¾ closed |
| 4 | eyelids completely closed |

Thus, for example, if an animal had a ptosis of 1 for one eye and 2 for the other, it was given the score of 1.5. The results obtained for the preferred compounds of the invention and with 5 mg/kg of imipramine are given hereunder, each figure representing the average of ten tests (5 animals of which both eyes were examined)

TABLE III

| | | | Ptosis | | |
|---|---|---|---|---|---|
| | 1 h. | 1 h.30 | 2 h. | 2 h.30 | 5 h. |
| Controls | 1.3 | 2.6 | 3.6 | 3.4 | 3.8 |
| Compound A | 1.2 | 1.6 | 2.5 | 3.2 | 3.6 |
| Compound B | 1.3 | 1.8 | 2.3 | 3.1 | 3.5 |
| Imipramine | 0.3 | 1.1 | 1.4 | 2.1 | 2.8 |

These results show that imipramine is more active than Compounds A and B in this test. However, Compounds A and B are less toxic than imipramine and do not possess anticholinergic properties as does imipramine. Furthermore, imipramine, unlike Compounds A and B has no anxiolytic activity.

Catatonia

An intraperitoneal dose of 40 mg/kg of the compound to be studied was administered to batches of 5 male rats of the $CF_1$ strain weighing about 300g. Thirty minutes later a dose of 3 mg/kg of reserpine was given by the same route. At various times after administration of the reserpine, the animals were suspended by the four paws to a horizontally stretched wire. The catatonic animals were those which maintained the position so given for at least 20 seconds.

The results obtained with the preferred compounds and 5 mg/kg of imipramine are given hereunder, each figure representing the average obtained in five tests. Each animal which maintained the position so given for at least 20 seconds received the score of 1.

TABLE IV

|  | 30 min. | 1 h. | Catatonia 1 h.30 | 2 h. | 2 h.30 | 5 h. |
|---|---|---|---|---|---|---|
| Controls | 0 | 0 | 4 | 5 | 5 | 3 |
| Compound A | 0 | 0 | 0 | 1 | 5 | 3 |
| Compound B | 0 | 0 | 1 | 2 | 5 | 3 |
| Imipramine | 0 | 0 | 2 | 5 | 5 | 3 |

These results show that Compounds A and B are more active in this test than imipramine at the doses indicated.

b. Potentiation of Motor Hyperactivity produced by Amphetamine

Compounds which have antidepressant properties generally potentiate the motor activity resulting from an injection of amphetamine.

An intraperitoneal dose of 50 mg/kg of the compound to be studied was administered to batches of 10 mice. Fifteen minutes later, a dose of 10 mg/kg of amphetamine was given to the same mice by the same route. The control animals only received the dose of amphetamine. The animals so treated were placed on a double electromagnetic apparatus designed to measure their degree of motricity as described in Test 3 c) above. Note was taken of the variation in their motricity over a given period of time by registering all their movements however slight.

The results obtained with 10 mg/kg of amphetamine alone and 10 mg/kg of amphetamine in association with 50 mg/kg of Compound A are given hereunder:

TABLE V

| Compound | Number of movements from - to | | | | | |
|---|---|---|---|---|---|---|
|  | 0 min. 15⁻min. | 15 min. 25⁻min. | 25 min. 35⁻min. | 35 min. 45⁻min. | 45 min. 55⁻min. | 55 min. 65⁻min. |
| Amphetamine 10 mg/kg | 600 | 615 | 640 | 635 | 675 | 740 |
| Amphetamine 10 mg/kg + Compound A 50 mg/kg | 680 | 640 | 725 | 780 | 840 | 835 |

7. Anticonvulsant action

Pentylenetetrazol-induced seizure

The purpose of this test which was carried out on mice was to determine whether the compounds of the invention, when given preventively by intraperitoneal route, were capable at certain doses of protecting some of the animals against the epileptic seizure produced by an adequate and predetermined dose of pentylenetetrazol which would be 100% fatal in the absence of the compound.

The test was carried out on batches of 10 male mice. Each batch of animals received an intraperitoneal dose of the compound to be studied so that each batch received a higher dose than the preceding batch. Thirty minutes after administration, the animals were each given 125 mg/kg of pentylenetetrazol by intraperitoneal route and the number of deaths was noted 3 hours after administration of the pentylenetetrazol.

In the case of the preferred compounds the $ED_{50}$ i.e. the dose which protected 50% of the animals against death was found to be as follows:

| Compound | $ED_{50}$ (in mg/kg) |
|---|---|
| A | 125 |
| B | 165 |

The efficacy index of the preferred compounds was also calculated by comparing the $ED_{50}$ with the dose required to obtain a hypnotic effect in 50% of the animals. This latter value is indicated by the symbol $HD_{50}$ or hypnotic dose 50 and the efficacy index by the fraction:

$$\frac{HD_{50}}{ED_{50}}$$

The efficacy indices obtained for Compounds A and B and for phenobarbital were as follows:

| Compound | Indices |
|---|---|
| A | 6 |
| B | 5 |
| Phenobarbital | 3.3 |

These figures show that Compounds A and B are much more advantageous than phenobarbital, the anticonvulsant dose of Compounds A and B being much farther removed from the hypnotic dose.

8. Cholinolytic Properties

Action with respect to tremorine

When injected into the mouse, tremorine and its metabolite, oxotremorine produce central cholinergic effects i.e. normal and provoked tremor as well as peripheral cholinergic effects i.e. weeping sweating, diarrhoea and salivation.

Male mice of the $OF_1$ strain weighing 22g, were divided into batches of 10. Each batch received, by intraperitoneal route, 50 mg/kg of the compound to be tested and thirty minutes later 10 mg/kg of tremorine. Thirty minutes after the injection of tremorine note was taken of the cholinergic effects on each animal in accordance with the following scale:

| 0 | no action |
| 1 | slight action |
| 2 | average action |
| 3 | strong action |
| 4 | very strong action |

The results obtained with Compound A and 50 mg/kg of imipramine are listed in the following Table and represent the average obtained with the animals of each batch:

TABLE VI

| | Peripheral cholinergic response | | | | Central response | |
|---|---|---|---|---|---|---|
| | | | | | | Tremor |
| | Weeping | Sweating | Diarrhoea | Salivation | Normal | Provoked |
| Controls | 3 | 4 | 4 | 4 | 3 | 4 |
| Compound A | 3 | 3 | 4 | 3 | 3 | 3 |
| Imipramine | 0.5 | 1 | 0 | 1 | 0 | 0.5 |

These figures show that Compound A, unlike imipramine, does not antagonize either the central effects or the peripheral effects provoked by tremorine.

It will be appreciated that for therapeutic use the compounds of the invention will normally be administered in the form of a pharmaceutical or veterinary composition, which may desirably be in a dosage unit form appropriate to the required mode of administration. Thus the composition may take the form of, for example, a coated or uncoated tablet, a hard-or soft-gelatin capsule, a suspension for oral administration containing from 100 to 500 mg of active substance for oral administration. The composition of the invention may also take the form of a suppository for rectal administration containing, in one administration unit, 100 to 500 mg for example of active ingredient or of a solution or suspension for parenteral administration containing in one administration unit form 50 to 400 mg, for example, of active ingredient.

According to the type of administration unit chosen, the therapeutic compositions will be prepared by associating at least one of the compounds of formula I with an appropriate excipient, the latter being composed, for example, of at least one ingredient selected from amongst the following substances: talc, magnesium stearate, milk sugar, saccharose, carboxymethylcellulose, starches, kaolin, levulite, cacoa and butter.

The following Examples illustrate the invention:

EXAMPLE 1

Preparation of 4-n-propyl-3-heptanol a. Preparation of 4-n-propyl-3-heptanone

In a flask were placed 17g (0.7 at.g) of magnesium turnings and 400 ml of anhydrous ether. To this mixture 76.2g (0.7 mole) of gaseous ethyl bromide were slowly added while gentle heating was maintained until disappearance of the magnesium turnings. Then a solution of 44g (0.35 mol) of 2-n-propyl-valeronitrile in either was added to the reaction medium. The complex which formed was decomposed with a mixture of hydrochloric acid and ice, then the resulting imine was hydrolysed under boiling. The reaction medium was extracted with ether and the ketone was distilled off from the ethereal solution.

In this manner, 4-n-propyl-3-heptanone, boiling at 180°C under 760 mm Hg, was obtained in a yield of 71% calculated on the nitrile.

By following the same procedure as that described above but using the appropriate starting products, the compounds listed hereunder were prepared:

| Compound | Boiling point °C under 760 mm Hg |
|---|---|
| 3-n-propyl-2-hexanone (yield : 80%) | 175 |
| 5-n-propyl-4-octanone (yield : 80%) | 203–204 |
| 6-n-propyl-5-nonanone (yield : 56%) | 218–220 | b. Preparation of 4-n-propyl-3-heptanol

In an Erlenmeyer flask cooled with an ice-bath was stirred, by means of a magnetic stirrer, a suspension of 15.6g (0.1 mol) of 4-n-propyl-3-heptanone in 150 ml of ethanol. To this suspension was added, drop-by-drop in 30 minutes, a suspension of 7.6g (0.2 mol) of sodium borohydride pulverized in 20 ml of water. When the reaction started the ice-bath was withdrawn, the mixture was stirred for 4 hours at room temperature and then allowed to stand for 12 hours. The reaction medium was then extracted by adding acetic acid to a pH of 6. The solution was concentrated, made alkaline by means of sodium carbonate to a pH of 8.5 and then extracted with ether. The aqueous phase was again acidified, made alkaline and extracted with ether. The extracts were collected, dried and evaporated. The residue obtained was carefully distilled twice under reduced pressure.

In this manner, 4-n-propyl-3-heptanol, boiling at 195°C under 760 mm Hg, was obtained in a yield of 50% calculated on the starting ketone and 36% calculated on the 2-n-propyl-valeronitrile.

By following the same procedure as that described above but using the appropriate starting products, the compounds listed hereunder were prepared:

| Compound | Boiling point °C |
|---|---|
| 3-n-propyl-2-hexanol (yield : 28%) | 184–186 (760 mm Hg) |
| 5-n-propyl-4-octanol (yield : 28%) | 70 (0.5 mm Hg) |

EXAMPLE 2

Preparation of 4-n-propyl-3-heptanol a. Preparation of 4-n-propyl-3-heptanone

In a flask were placed 24.3g (1 at.g) of magnesium turnings and 450 ml of anhydrous ether. To this mixture 108.9g (1 mol) of gaseous ethyl bromide were slowly added while gentle heating was maintained until disappearance of the magnesium turnings. While a nitrogen atmosphere was maintained in the flask, 97.5g (0.535 mol) of anhydrous cadmium chloride were added in 10 minutes and the mixture was heated for one hour. The ether was distilled out and replaced by an equivalent volume of anhydrous benzene. After the flask had been cooled with ice, a cold solution of 130g (0.8 mol) of 2-n-propyl-valeryl chloride in benzene was added. The reaction mixture was then stirred and boiled for 2 to 3 hours. The end of the reaction was indicated by the fact that stirring became more and more difficult. The reaction medium was extracted with ether and the ketone was distilled off from the ethereal solution.

In this manner, 4-n-propyl-3-heptanone, boiling at 180°C under 760 mm Hg, was obtained in a yield of 96% calculated on the valeryl chloride.

By following the same procedure as that described above but using the appropriate starting products, the compounds listed hereunder were prepared:

| Compound | Boiling point °C under 760 mm Hg |
| --- | --- |
| 3-n-propyl-2-hexanone (yield : 77%) | 175 |
| 5-n-propyl-4-octanone (yield : 95%) | 203–204 |
| 6-n-propyl-5-nonanone (yield : 77%) | 218–220 | b. Preparation of 4-n-propyl-3-heptanol

In a bomb-apparatus, were placed 15.6g (0.1 mol) of 4-n-propyl-3-heptanone, 100 ml of absolute ethanol, 1 ml of triethylamine and then 2g of Raney's nickel (i.e. a finely divided nickel catalyst obtained by dissolving out with alkali the aluminum from a nickel-aluminium alloy). The mixture was agitated under a hydrogen pressure of 30 kg/cm$^2$ at 50°C for 2 hours. After cooling, the gas was eliminated, the suspension was filtered and the resulting solution was evaporated and then distilled under vacuum.

In this manner, 4-n-propyl-3-heptanol, boiling at 195°C under 760 mm Hg, was obtained in a yield of 46% calculated on the starting ketone, and 44% calculated on the 2-n-propyl-valeryl chloride.

By following the same procedure as that described above but using the appropriate starting products, the compounds listed hereunder were prepared:

| Compound | Boiling point °C |
| --- | --- |
| 3-n-propyl-2-hexanol (yield : 20%) | 184–186 (760 mm Hg) |
| 5-n-propyl-4-octanol (yield : 75%) | 70 (0.5 mm Hg) |
| 6-n-propyl-5-nonanol (yield : 35%) | 230 (760 mm Hg) |

EXAMPLE 3

Preparation of 4-n-propyl-3-heptanol carbamate

To a flask containing 2.1g (0.022 mol) of phosgene in toluene were rapidly added 3.2g (0.02 mol) of 4-n-propyl-3-heptanol. During this operation the reaction medium was continuously cooled and stirred. Thirty minutes later, the mixture was concentrated under vacuum and the crude chloroformate formed was slowly poured into 30 ml (5 volumes) of cold concentrated ammonia. The precipitate which formed changed into a supernatant oil. After decantation, this oil crystallized under vacuum into white crystals which were recrystallized twice from ethanol at 65°C.

In this manner, 4-n-propyl-3-heptanol carbamate, melting at 53.5°C, was obtained in a yield of 40%.

We claim:
1. 4-n-propyl-3-heptanol carbamate.
2. 4-n-propyl-3-heptanol.

\* \* \* \* \*

UNITED STATES PATENT OFFICE
CERTIFICATE OF CORRECTION

Patent No. 3,929,869      Dated December 30, 1975

Inventor(s) Martine Pierrette Benoit-Guyod; Jean-Louis Alain Benoit-Guyod; Andre Louis Boucherle; Pierre Luc Eymard It is certified that error appears in the above-identified patent and that said Letters Patent are hereby corrected as shown below:

Page 1, first column, after line [21], insert the following:

-- [30] Foreign Application Priority Data
       June 29, 1972   United Kingdom   30600 --

Column 1, line 61, "approprite" should read -- appropriate --.

Column 7, line 22, "$D_{50}$" should read -- $LD_{50}$ --.

Column 8, line 9 "$NDT_{50}$" should read -- $NTD_{50}$ --.

Column 8, after line 15, "$NDT_{50}$" should read -- $NTD_{50}$ --.

Column 8, after line 56, "$NDT_{50}$" should read -- $NTD_{50}$ --.

Column 15, line 1, "ketone" should read -- solvent --.

Signed and Sealed this

Twenty-third Day of November 1976

[SEAL]

Attest:

RUTH C. MASON
*Attesting Officer*

C. MARSHALL DANN
*Commissioner of Patents and Trademarks*